UNITED STATES PATENT OFFICE.

HANS ARNOLD, OF CHARLOTTENBURG, GERMANY, ASSIGNOR TO THE FIRM OF DR. C. KNÖFLER & CO., OF PLOTZENSEE, NEAR BERLIN, GERMANY.

PROCESS FOR THE MANUFACTURE OF FIREPROOF UTENSILS FROM REFRACTORY OXIDS.

1,157,662.   Specification of Letters Patent.   Patented Oct. 26, 1915.

No Drawing.   Application filed October 5, 1914.   Serial No. 865,197.

*To all whom it may concern:*

Be it known that I, HANS ARNOLD, a subject of the German Emperor, and residing at Charlottenburg, near Berlin, in the Empire of Germany, have invented certain new and useful Improvements in Processes for the Manufacture of Fireproof Utensils from Refractory Oxids, of which the following is a specification.

The object of the present process is the manufacture of fire-proof vessels and implements from the oxids of titanium, beryllium, zirconium, thorium and the rare earths or mixtures of those oxids respectively by casting or molding.

It has been found, that certain oxids, for instance pure zirconium oxid or thorium oxid, cannot be cast or molded in a pure state, because no matter whether calcined or not calcined, they cannot be made up into a uniform, castable or moldable paste owing to the heavy oxids separating out and settling to the bottom. That fault can be remedied to a certain extent by grinding the raw material in a wet state. Nevertheless, the crucibles cast or molded from such a mass have no natural solidity and firmness and crack when being dried for want of plasticity. There has been a suggestion to remedy that fault by the addition of some acid to the mass ready for casting or molding. Crucibles prepared from such a mass are free from cracks and can be taken out from the mold. Unfortunately, those cracks again put in an appearance, when the crucibles are dried in the drying stove or calcined in the furnace. Another proposition has been made to increase the plasticity of the mass by suspending the mass in a colloidal solution of zirconium hydrate or a hydrate of thorium, beryllium and so forth or a hydrate of a rare earth or provided the mass had been ground in a wet state to mix intimately with the paste some solid sol of zirconium hydrate and so forth; *i. e.* the dry residue of a colloidal solution of zirconium hydrate or some other sol. There is no doubt that the paste thus produced presents a higher degree of plasticity inasmuch as the crucibles made therefrom do not crack after being calcined. However, another drawback set in which was quite as bad, inasmuch as the pores of the mold were quickly filled up by the sol, so that the crucibles could not be removed from the mold. As a matter of fact, they adhere fast to the mold and burst when being loosened. I have now found that I can avoid that sticking fast of the casting to the mold by adding some free mineral acid to the mass before casting. I therefore add to the extremely fine powdered mass after being made up with water and a colloidal solution to a paste a certain amount of a mineral acid, viz:—hydrochloric acid, nitric acid or the like. The vessels obtained from such a mass can be easily removed from the molds and do not crack after calcining. I have also mixed wet ground raw-material with a solid sol and some free acid and the result was pretty good. But the addition of a solid sol has the disadvantage that the small sol particles easily stick together forming lumps, that are of course objectionable. I therefore prefer to suspend the solid sol in some hot water and to apply that liquid mass as a kind of concentrated colloidal solution.

The invention therefore consists in the simultaneous application of a colloidal solution and of a free acid or of a mixture of a solid sol and free acid as a cementing medium for casting or molding the oxids of titanium, beryllium, thorium, zirconium and other rare earths. It will be understood that the application of colloidal solutions by themselves or a solid sol by itself or a free acid alone will not bring about the result to be attained.

I found that 50 parts of the thin colloidal hydrate solution or 1 part of the solid sol are quite sufficient for 100 parts of the solid oxid. The amount of acid required is such, that the paste contains about 0.1% of free acid. Preferably a mixture of the oxids in a calcined and uncalcined state is used for casting or molding because under those circumstances the shrinkage of the mass when being calcined is greatly decreased. I have also found that it is advantageous to employ certain precautions in order to obtain a product free from cracks. For instance, it is greatly to be recommended to calcine the castings and moldings previously dried in the drying stove in such a manner, that the intermediary stages of temperatures are avoided as much as convenient and the calcining temperature is reached as quickly as possible. I have found that the raw material when being calcined passes through most remarkable stages. At first up to a temperature of about 1600° C. the castings and moldings become very soft and incoherent so that they crumble into a fine powder when being struck or touched. If the heat increases a new modification of the zirconium oxid or other oxid appears to be produced and sometimes that conversion is accompanied by a flash of light. At that stage a strong shrinkage of the mass sets in. On further increasing the heat the moldings and castings become firmer and the shrinkage greatly decreases. Not until that stage is reached the castings and moldings are proof against blows and sudden alterations of temperature. The temperature where that final conversion is reached, varies with the different oxids; with zirconium oxid it lies at about 2100° C. From the foregoing it will be seen that it is very important to reach the calcining temperature as quickly as possible, because in that manner a great saving is made, less stuff going to waste by cracking. I have also found that the vessels after calcining can be polished by means well known in the trade whereby the density of the vessels is increased.

Having now described my invention, what I desire to secure by a patent of the United States is:—

1. The herein described process of manufacturing fire-proof utensils from rare earth oxids, which process consists in treating a paste of such oxids with free acid and a colloidal hydroxid of at least one of the metals of which the oxid is present in said paste, forming said paste into the desired shape, and thereafter calcining the product.

2. The herein described process of manufacturing fire-proof utensils from rare earth oxids, which process consists in treating a paste of such oxids with a small quantity of free mineral acid and a colloidal hydroxid of at least one of the metals of which the oxid is present in said paste, forming said paste into the desired shape and thereafter calcining the product.

3. The herein described process of manufacturing fire-proof utensils from rare earth oxids, which process consists in treating a paste of such oxids with free acid and a dilute colloidal solution of at least one of the metals of which the oxid is present in the paste, forming said paste into the desired shape, and thereafter calcining the product.

4. The herein described process of manufacturing fire-proof utensils from rare earth oxids, which process consists in treating a paste of such oxids with a small quantity of free mineral acid and a dilute colloidal solution of at least one of the metals of which the oxid is present in the paste, forming said paste into the desired shape, and thereafter calcining the product.

In testimony whereof I affix my signature in presence of two witnesses.

HANS ARNOLD.

Witnesses:
WOLDEMAR HAUPT,
HENRY HASPER.